A. BARR & W. STROUD.
RANGE FINDER.
APPLICATION FILED JULY 17, 1911.
1,018,548.
Patented Feb. 27, 1912.
2 SHEETS—SHEET 1.
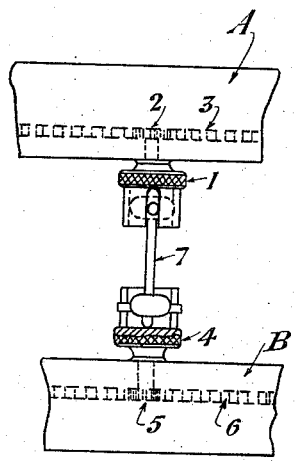
FIG: 1.
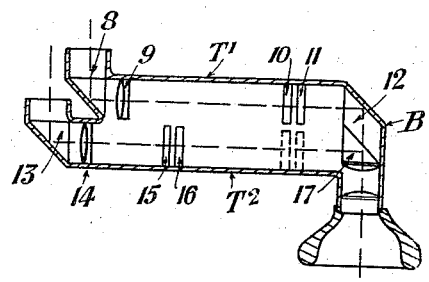
FIG: 2.
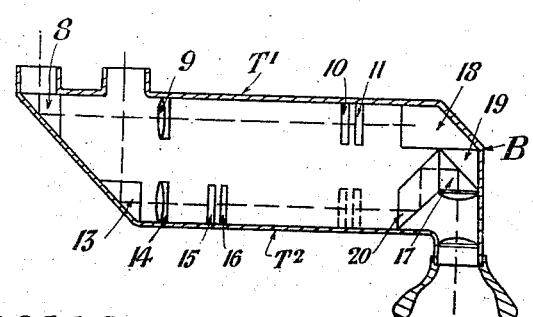
FIG: 3.
Witnesses.
J. W. Fowler, Jr.
G. Manning.
Inventors.
Archibald Barr,
William Stroud
By J. Walter Fowler
atty.

A. BARR & W. STROUD.
RANGE FINDER.
APPLICATION FILED JULY 17, 1911.
1,018,548.
Patented Feb. 27, 1912.
2 SHEETS—SHEET 2.
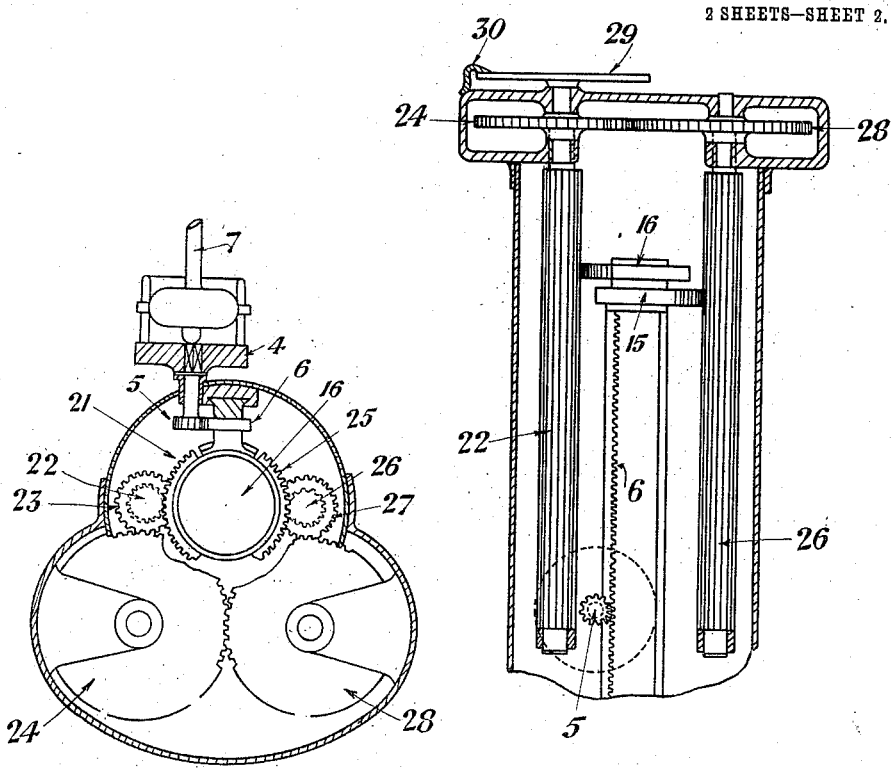
FIG: 5.   FIG: 4.
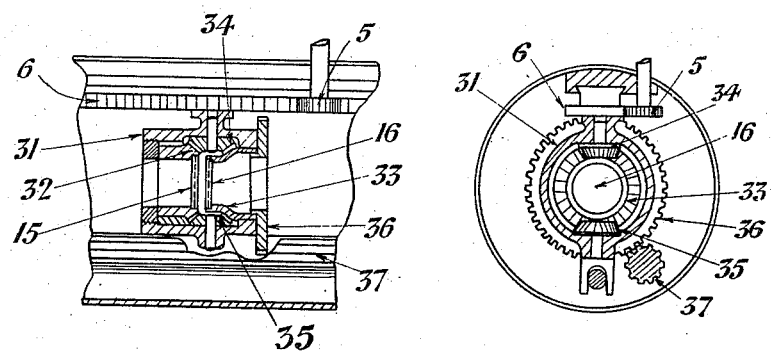
FIG: 6   FIG: 7.
Witnesses.
J. W. Fowler, Jr.
G. Manning
Inventors.
Archibald Barr.
William Stroud.
By J. Walter Fowler
atty.

UNITED STATES PATENT OFFICE.

ARCHIBALD BARR AND WILLIAM STROUD, OF GLASGOW, SCOTLAND.

RANGE-FINDER.

1,018,548. Specification of Letters Patent. Patented Feb. 27, 1912.

Application filed July 17, 1911. Serial No. 638,971.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented new and useful improvements in range-finders with special reference to the determination with increased accuracy of the rate of change of range, (for which we have made application for patent in Great Britain, No. 18,799, bearing date August 10, 1910,) of which the following is a specification.

Rangefinders may be divided into two classes (1) those whose base is at the observing station, hereinafter termed "rangefinders," and (2) those which have a virtual base at the target, hereinafter termed "rangekeepers."

Rangefinders can be used in determining the range of a target whose dimensions need not be known. Rangekeepers require a knowledge of the absolute value of the distance between two points of the target. Usually the two points will be in the same vertical line (or approximately so) and for clearness in the description we shall assume that they are so in what follows. On a ship at sea a large vertical length can usually be seen so that the equivalent base length available for range-finding is much greater with the range-keeping class of instruments than with range-finders. However, rangekeepers are scarcely ever used owing to lack of sufficiently accurate knowledge of the dimensions of the particular target in question, or owing to the fact that these dimensions may be deliberately modified by the enemy.

The object of our invention is to increase the accuracy of rangefinding operations and more especially to increase the accuracy of determination of the rate of change of range of a target. This we accomplish by combining together, or otherwise associating a rangefinder (A) of any type having a self-contained base, but which we shall assume for purposes of description to be of the coincidence type, and a rangekeeper (B) in the use of which a knowledge of the dimensions of the target is involved.

Broadly speaking the method of operation is as follows:—The range is first obtained by the rangefinder A in the ordinary way (assuming that the actual length of the virtual base for the rangekeeper B at the target is not known). This range determined by A is used to enable an observer to set the mechanism of rangekeeper B so that B indicates the range so determined by A when an observation is taken upon the base available at the target. This action will hereinafter be referred to as "setting" the rangefinder. The variation of range or rate of change of range is then observed in B, the increased accuracy of the latter observations being due to the large base (say, the height of the mast above the deck or sea level or other suitable mark or line) available at the target, and according to our invention provision is made for the interlinking or intergearing of the two range measuring mechanisms in the rangefinder A and the rangekeeper B respectively, so that when the mechanism of one is moved the mechanism of the other is also moved to the appropriate amount and in the right direction. In this way (if no alteration has been made in the base used for the rangekeeper B) as the observer at B "keeps" the target correctly he will at the same time preserve the images in coincidence in the field of view of the rangefinder A; whereas if the enemy alters the height that is being used as a base for B as the observer at B "keeps" on the target, the images in A will no longer appear in coincidence and the observation made at A will indicate that there is something wrong. If two observers are engaged in making the observations, the observer at A informs the observer at B of this and sets A so that the images are in coincidence and the observer at B, after making the necessary amended setting of his instrument by means provided according to this invention, some examples of which are described below, keeps on the target as before.

The method of operation and some examples of constructions according to this invention will now be described with reference to the accompanying drawings, in which:—

Figure 1 shows one method of gearing together the working heads of rangefinder A and rangekeeper B. Figs. 2 and 3 show plans of alternative methods of constructing rangekeeper B. Fig. 4 shows a plan looking from below and Fig. 5 a sectional elevation of one form of mechanism for effecting the optical settings and measurements in the rangekeeper. Figs. 6 and 7 show two views in sectional elevation of alternative mechanism for accomplishing the same result.

In Fig. 1, A represents a rangefinder whose working head is 1 operating a pinion 2 and thereby translating a rack 3 to which the refracting prism of A is attached. B represents a rangekeeper whose working head is 4 operating a pinion 5 and thereby translating a rack 6 to which a pair of rotatable prisms in B is attached. The working heads of A and B are geared together by means of the coupling 7. Now the range scale in A and that in B are each of them reciprocal scales. We may provide two scales of ranges the one for A and the other for B. The "infinity" position for the range-keeping prism in B is so adjusted either by shifting one of the objectives or by appropriately constructing the eyepiece prism system or by the introduction of an extra refracting prism (or prisms) that the pair of prisms is in the vicinity of the eyepiece prism system when the scale indicates "infinity" and this "infinity" position can be experimentally determined by observing that there is no lack of coincidence in the two halves of the field of view, upon any horizontal line when using the instrument in the position suitable for observation upon vertical targets. The single range measuring refracting prism in A and the angle-measuring mechanism in B may next be geared together in such a fashion that the range read off is the same on the two scales. This implies that the scale lengths are the same if the gearing is as 1:1, but if the gearing is in any other ratio, we may make the scale length of B to correspond to that of A so that the scale readings are always the same in the two instruments.

In order that the observer may be able to bring any two suitable points of the target into coincidence in the field of view of the rangekeeper whatever the position of the mechanism for measuring the range, we prefer to employ as the optical means for effecting the settings and measurement two rotatable and translatable refracting prisms, the rotation of these prisms through equal angles in opposite directions being used to produce the equivalent of a single prism of variable angle of refraction so that the image of one point of the target may be brought into coincidence with the second point in the initial setting, the subsequent "keeping" of the range being accomplished by translating the pair of prisms. One type of construction of the rangekeeper, to be described with reference to the accompanying drawings, may consist of two telescopes $T^1$ $T^2$ of equal magnification with common eyepiece and suitable eyepiece prisms for observing the two fields together. These two telescopes are similarly directed, i. e. the two objectives are in the neighborhood of one another, say, side by side, as shown in the drawings. An alternative arrangement, not shown, would be to place one above the other. One of the rotatable prisms may be in one telescope and the other in the other telescope, but preferably they are placed either both in $T^1$ or both in $T^2$ and we shall assume that this is the arrangement adopted. The pair of prisms has now to be translated along the path of one of the beams in such a fashion that this beam is refracted vertically up or down, i. e. the equivalent refracting angle of the pair must be in a vertical plane, since we have assumed the virtual base to be vertical. Fig. 2 shows a plan of one such form of rangekeeper B, consisting of the equivalent of two telescopes $T^1$ $T^2$ of equal magnifying power with common eyepiece. These telescopes are represented in such a way that the image formed will be inverted and laterally reversed; by using a terrestrial eyepiece or by appropriate optical reflections the image could be made erect and laterally correct although, for simplicity in the drawings, the optical arrangements in Figs. 2 and 3 are shown as suitable for an inverting telescope. The one telescope $T^1$ consists of a prism 8, an objective 9 (and, if desired, a pair of rotatable prisms 10 and 11 incapable of travel along the tube of the instrument), a rhomboidal prism 12 to which is cemented the prism 17, whose hypotenusal face is partially silvered or silvered in parts. The second telescope $T^2$ consists similarly of prism 13, objective 14, a pair of rotatable prisms 15 and 16 capable of translation along the tube and the prism 17. On looking into the eyepiece we shall see two overlapping fields if the hypotenusal face of 17 is partially silvered all over, but if we desire to have two separate but contiguous fields we may silver the whole of the hypotenusal face of 17 and subsequently remove a portion of the silvering, so as to leave (say) a vertical strip through which the image formed by the telescope $T^1$ may be seen.

Fig. 3 shows an alternative form of arrangement of the optical components of the rangekeeper B. This figure differs from the preceding Fig. 2 chiefly in the form of eyepiece prisms which are designed so that with the objectives 9 and 14 opposite one another in the frame, the thickness of glass traversed by the two beams of $T^1$ and $T^2$ shall be the same and the focal planes coincident. This may be accomplished by means of the prisms 18 and 19 inserted in $T^1$ and by means of the doubly reflecting prism 20 inserted in $T^2$. The hypotenusal face of 17 is partially silvered or silvered in parts and has 19 cemented to it.

In Figs. 4 and 5 are shown views of one form of mechanism for translating the prisms 15 and 16 and rotating them in opposite directions at any point of their travel. The prisms 15 and 16 are carried on a mounting fastened to the rack 6 which can be moved to and fro by the pinion 5. The prism 16 is carried in a frame a portion of which 21 has spur teeth cut in it. These teeth gear in the teeth of a long pinion rod 22 to the end of which is fastened the spur wheel 23 gearing into the spur wheel 24. The spur wheel 23 is unrepresented in Fig. 4 as it is placed above the wheel 24. Similarly the second prism 15 has a frame with toothed segment 25 gearing into a long pinion rod 26 to the end of which is fastened the spur wheel 27 (not shown in Fig. 4) gearing into the spur wheel 28. The trains of mechanism 21 to 24 and 25 to 28 are equal in all respects and moreover the wheels 24 and 28 are geared directly together. Attached to the wheel 24 and rotating with it is a disk 29 (graduated to represent the base of the target for the rangekeeper) provided with a fixed pointer 30. By rotating the disk 29 we produce rotation of prism 15 in one direction and rotation of prism 16 to an equal amount in the opposite direction so that the deflection produced by the pair of prisms may be varied and the magnitude of the deflection will be a function of the reading of the pointer 30 upon the disk 29.

Figs. 6 and 7 show a longitudinal and cross sectional elevation of mechanism for carrying out an alternative method of rotating the two refracting prisms at any point of their travel. The pinion 5 is capable of translating the rack 6 to which is attached a frame 31 carrying the refracting prisms 15 and 16 in holders provided with bevel wheels 32, 33 which are geared so as to rotate equally in opposite directions by means of the bevel wheel 34 (or wheels 34 and 35) mounted in the frame 31. One of these holders has a spur wheel 36 attached to it which gears into the long pinion rod 37 at any position of the travel of the frame 31. If then the pinion rod 37 is rotated, the wheel 36 will be turned together with the prism 16 and this will produce an equal rotation in the opposite direction of the prism 15. It is to be understood in connection with these figures that the pinion rod 37 is provided at one end with a disk and pointer just as is shown in Fig. 4 for the pinion rod 22.

In the case of Figs. 4 and 5 as well as that of Figs. 6 and 7 we have only shown the mechanism for rotating the pair of prisms 15 and 16, that is the pair of rotatable prisms 10 and 11 in the telescope T¹ are supposed to have been omitted. In many cases it is desirable to have these prisms 10 and 11 inserted in either the telescope T¹ or T². The reason for this is that if 10 and 11 are omitted the "infinity" position for the rangekeeper B will correspond to a position of the prisms 15 and 16 coincident with the focal planes of the telescope and if the designs of either Fig. 2 or Fig. 3 are adopted this position is already occupied by glass. The introduction of the pair of prisms 10 and 11 allows, however, of this "infinity" position being placed in any convenient situation, e. g. in Figs. 2 and 3 when the prisms 10 and 11 are present the "infinity" position will correspond to that position of 15 and 16 shown by the dotted lines. When, therefore, the prisms 10 and 11 are inserted, it will be necessary to duplicate the rotating apparatus shown in Figs. 4 to 7 in all respects except that (as the prisms 10 and 11 have not to travel) the long pinion rod may be replaced by a pinion wheel. These two pieces of rotating apparatus have now to be geared together so that as 15 and 16 are rotated over one another the equal prisms 10 and 11 are rotated over one another to an equal amount.

We have described the apparatus as though made for two separate observers, but we may, if desired, construct the two instruments in the same case and arrange that the field of view of the rangefinder may be seen by the one eye of the observer and the field of view of the rangekeeper by the other eye.

We claim:—

1. A rangefinder and a rangekeeper each having range measuring mechanism, in combination with means for simultaneously operating the two mechanisms, for the purposes set forth.

2. A rangefinder and a rangekeeper each having range measuring mechanism, and means for setting the rangekeeper, in combination with means for simultaneously operating the two mechanisms, for the purposes set forth.

3. A rangefinder and a rangekeeper each having range measuring mechanism, the rangekeeper having refracting prisms rotatable in opposite directions for effecting settings, in combination with means for simultaneously operating the two mechanisms, for the purposes set forth.

4. A rangefinder and a rangekeeper each having range measuring mechanism, each mechanism comprising a scale indicating similar ranges, with means for simultaneously operating the two mechanisms, in combination with means for setting the rangekeeper, for the purposes set forth.

5. A rangefinder and a rangekeeper each having range measuring mechanism, the rangekeeper having refracting prisms rotatable in opposite directions for effecting the required setting and translatable for keeping the rangekeeper set upon the target, in combination with means for simultaneously operating the two mechanisms, for the purposes set forth.

6. A rangefinder and a rangekeeper each having range measuring mechanism, the rangekeeper consisting of two telescopes of equal magnification and having means for observing the two fields together, two refracting prisms rotatable in opposite directions placed in one of the telescopes and translatable therein, in combination with means for simultaneously operating the two mechanisms, for the purposes set forth.

7. A rangefinder and a rangekeeper each having range measuring mechanism, the rangekeeper having refracting prisms rotatable in opposite directions and translatable, each prism being mounted in a frame carried by a rack moved to and fro by a pinion, each frame having a segmental toothed rack, each in gear with a separate long pinion, the two long pinions being geared to rotate together in opposite directions, and means for turning the long pinions, in combination with means for simultaneously operating the two mechanisms, for the purposes set forth.

8. A rangefinder and a rangekeeper each having range measuring mechanism, a working head for operating each mechanism, in combination with means for coupling the two working heads, for the purposes set forth.

9. A rangefinder and a rangekeeper each having a range measuring mechanism, that of the rangekeeper comprising two refracting prisms rotatable in opposite directions and translatable, each prism being mounted in a holder carried by a rack moved to and fro by a pinion in combination with a pinion rod engaging with a wheel, the rotation of which communicates by suitable gearing equal and opposite rotational motions to the two refracting prisms.

10. A rangefinder of the self contained short base type and a rangekeeper of the type working upon a base at the distant object and operated by the translation of two refracting prisms capable of being adjusted by relative rotation to suit any suitable base length observable on the target in combination with a coupling mechanism so arranged that the range measuring devices in the two instruments may be worked simultaneously.

In testimony whereof we affix our signatures in presence of two witnesses.

ARCHIBALD BARR.
WILLIAM STROUD.

Witnesses:
ARLME DAVIES,
JESSIE HOWAT.

Copies of this patent may be obtained for five cents each, by addressing the "Commissioner of Patents, Washington, D. C."